Sept. 12, 1967     W. O. PATSCHORKE     3,341,315
GLASS DELIVERY SYSTEM
Filed Aug. 6, 1964
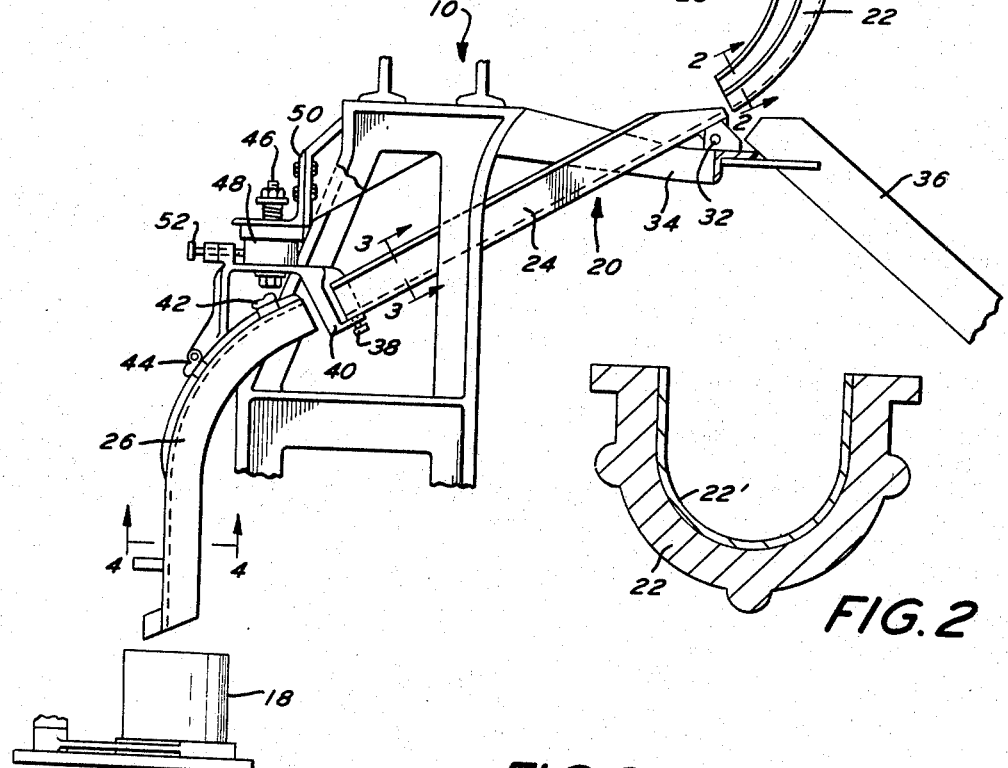
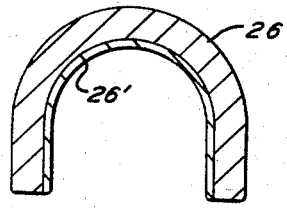
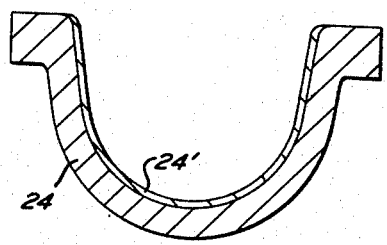
INVENTOR
WALTER O. PATSCHORKE
BY
ATTORNEYS.

3,341,315
GLASS DELIVERY SYSTEM
Walter O. Patschorke, Bridgeton, N.J., assignor to Maul Brothers, Inc., Millville, N.J., a corporation of New Jersey
Filed Aug. 6, 1964, Ser. No. 387,901
7 Claims. (Cl. 65—304)

This invention relates to a glass delivery system, and more particularly, to the glass delivery system from a glass feeder to a mold on an individual section glassware forming machine.

Heretofore, the glass delivery system on individual section glassware forming machine has demanded the attention of those skilled in the art. The problem of a glass delivery system which does not result in the glass charge sticking to the delivery system has been long sought after. Various solutions have been proposed.

In accordance with some solutions which have been proposed heretofore, the glass delivery system is made from metal and a lubricant is introduced onto the scoop, trough and deflector. For example, see U.S. Patent 1,911,119. Other solutions proposed heretofore included the provision of a plastic coating on the inner surface of the glass delivery system, see U.S. Patent 2,758,421. Each of these systems proposed heretofore have inherent drawbacks or disadvantages.

In accordance with the present invention, the glass delivery system is made from a lightweight non-corrosive material such as aluminum. The need for lubrication on the surfaces of the system which contact the glass charge is avoided by providing such surfaces with a hard coating comprised principally of aluminum oxide. In this regard, the temperature of the glass charge may be approximately 2000° F. By making the glass delivery system from a lightweight material such as aluminum as compared with the conventional use of iron or steel, the components of the glass delivery system are more easily replaced when necessary, are not as easily broken, and the reduction in weight also reduces the inertia of the parts so as to require less power to stop and start movement of the parts while permitting the speeding up of certain movements.

It is an object of the present invention to provide a glass delivery system for an individual section glassware forming machine which does not require the application of lubricants and therefore may operate "dry."

It is another object of the present invention to provide a glass delivery system made from a lightweight non-corrosive material having a hard smooth glass engaging surface which does not require the use of lubrication.

It is another object of the present invention to provide a glass delivery system having minimum weight and inertial of its parts while having a smooth surface adapted to convey glass charges at a substantial temperature with minimum friction and minimal chance of marking or deforming the glass charge.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a partial elevation view of the glass delivery system of an individual section glassware forming machine.

FIGURE 2 is a sectional view taken along the line 2—2 in FIGURE 1.

FIGURE 3 is a sectional view taken along the line 3—3 in FIGURE 1.

FIGURE 4 is a sectional view taken along the line 4—4 in FIGURE 1.

Referring to the drawings in detail, wherein like numerals indicate like elements, there is shown in FIGURE 1 a portion of an individual section glassware forming machine designated generally as 10 and disposed below a feeder designated generally as 12.

The feeder 12 may be of conventional construction and includes a discharge opening associated with which is an upright plunger 14 for controlling flow through the opening. Below the discharge opening, there are provided a pair of shears 16 which separate the molten glass into glass charges or globs. A glass delivery system designated generally as 20 is adapted to receive the glass charge and convey the same to a mold 18 forming a part of one section of the individual section glassware forming machine 10. A separate glass delivery system is provided for each mold of the machine 10 as is well known to those skilled in the art to which the present invention pertains.

The glass delivery system 20 includes a scoop 22, a trough 24 and a deflector 26 each of which are U-shaped in cross section. The scoop 22 is designed to intercept the glass charge issuing from the feeder 12 and cut off by the shears 16. The scoop 22 is supported at one end of a bracket 28 connected to a piston rod 30. The end of piston rod 30 (not shown) is structurally interrelated with a fluid pressure cylinder having suitable control valve means for selectively introducing motive fluid to control reciprocation of the scoop 22. In FIGURE 1, the scoop 22 is in a position wherein it is adapted to intercept the mold charge and deliver the same to the trough 24.

The scoop 22, trough 24 and deflector 26 are each made from a lightweight non-corrosive material such as aluminum. The surface of the scoop 22 adapted to come in contact with the glass charge is provided with a hard coating designated as 22′. The surface of the trough 24 adapted to contact the glass charge is provided with a hard coating designated as 24′. The surface of the deflector 26 adapted to contact the glass charge is provided with a hard coating designated as 26′. Each of the coatings 22′, 24′, and 26′ are aluminum oxide coatings having a polished smooth finish such as a fifty micro inches, for conveying the hot glass charge with minimum friction and minimum chance of marking or deforming the hot charge. The coatings 22′, 24′ and 26′, preferably have a thickness of between about .008 and .0015 inch. These coatings will withstand temperatures up to 3700° F., have a high resistance to wear, do not require lubrication to facilitate smooth delivery of the glass charge thereby avoiding the conventional occurrence of smoke resulting from the lubricant being in contact with the glass charge. Also, the use of aluminum for the scoop 22, trough 24, and deflector 26 enables these components to retain heat for a longer period of time in a more uniform manner thereby tending to avoid cooling of the glass charge in its travel from the feeder 12 to the mold 18.

The trough 24 is disposed at an angle to the horizontal. The upper end of the trough 24 is pivotably coupled to a pin 32 supported by a bracket 34 extending from the frame of the machine 10. A chute 36 is also supported by the bracket 34 to receive any glass charges not intercepted by the scoop 22. The chute 36 directs any charges received by it to a receptacle or other holding area. The lower end of the trough 24 is supported for vertical adjustment by a screw 38 on bracket 40. Bracket 40 is likewise supported by the frame 10.

The deflector 26 is supported at joints 42 and 44 by the bracket 40. The bracket 40 is supported for universal movement in a horizontal plane by a vertically disposed bolt 46 extending through the bracket 40, intermediate member 48, and a flange on bracket 50. Bracket 50 is fixedly coupled to the frame of the machine 10. Suitable means such as an adjusting screw 52 is provided for adjusting the bracket 40 with respect to the bracket 50 in one horizontal direction and a similar adjusting screw (not shown) is provided for adjustment in another horizontal direction perpendicular to said first mentioned horizontal direction. By adjusting screw 52 and a corresponding screw (not shown), a bracket 40, the lower end of trough 24, and the deflector 26 may be shifted horizontally in suitable directions in order to properly align the lower end of the deflector 290 with the blank mold 18. The remaining portion of the machine 10 not shown and the intricate details relating to supporting and adjusting the trough and/or deflector are well known to those skilled in the art and reference in this regard may be had to Patent 1,911,119. As will be apparent from said Patent 1,911,119 and well known to those skilled in the art, a glass delivery system 20 will be provided for each blank mold 18 with means being provided to reciprocate the scoop 22 for each glass delivery system to a glass intercepting position as shown in FIGURE 1 and to an inoperative position in timed sequence.

The present invention is particularly directed to the components of the glass delivery system and their structural inter-relationship whereby lubricant is not needed. That is, the system may be used "dry." A glass delivery system wihch is "dry," avoids the occurrence of smoke which is incident to a conventional glass delivery system which requires lubrication. By making the components glass delivery system from a material such as aluminum, the weight of the system may be reduced by as much as two thirds. In addition, the use of aluminum enables the component to be made much faster with the same tools and jigs formerly used with cast iron or steel components. The coatings 22′, 24′ and 26′ provide a smoother thin finish in less time than could be accomplished by providing a highly polished surface. The process for providing the coatings 22′, 24′ and 26′ may be abrasion resistant aluminum oxide anodic coatings as per U.S. Patent 2,692,852.

Processing as per Patent 2,692,851 is commercially available. The coatings 22′, 24′ and 26′ as commercially available are approximately file hard and will scratch glass.

The present invention may be embodied in other specific forms without departing from the spirit or essential attributes thereof and, accordingly, reference should be made to the appended claims, rather than to the foregoing specification as indicating the scope of the invention.

I claim:

1. A glass delivery system for hot material comprising a generally U-shaped member in cross section made from aluminum and angled with respect to the horizontal, a material engaging surface on said member having a generally uniform coating of aluminum oxide which is smooth and has a thickness of at least .0015 inch, and a feeder above said member for feeding gobs of hot glass to said member, whereby the member may deliver the gobs of hot glass to a molding machine.

2. A system in accordance with claim 1 wherein said material engageable surface of said member is on the inner surface of said member, and said coating having a surface finish of about 50 microinches.

3. A system in accordance with claim 2 wherein said member is arcuate.

4. A glass delivery system for a glassware forming machine comprising a scoop member for intercepting hot glass charges from a feeder and delivering the same to a trough member, a trough member for receiving the hot glass charge from the scoop member and delivering the same to a deflector member, a deflector member for receiving the hot glass charge from the trough member and delivering the same to a blank mold, each of said members being made from aluminum, each member having an aluminum oxide coating for its glass charge engaging surfaces, the coating on each of said members being smooth for conveying the hot glass charge with minimum friction.

5. A system in accordance with claim 4 where each of said members are U-shaped in cross section, each coating being generally uniform in thickness and having a minimum thickness of about .0015 inch and a maximum thickness of about .008 inch.

6. A system in accordance with claim 4 including means for reciprocating the scoop member, means for adjusting the elevation of the lower end of the trough member, and means for adjusting the horizontal position of the deflector member.

7. A glass delivery system for glassware forming machines wherein hot glass charges are to be conveyed from a feeder to a mold comprising a generally upright arcuate scoop which is U-shaped in cross section, said scoop being adapted to intercept hot glass charges and transfer the same to a trough, a trough which is generally U-shaped in cross section and adapted to receive hot glass charges from the scoop and deliver the same to its deflector, said trough being disposed in an angle with respect to the horizontal, a deflector for receiving hot glass charges from the trough and delivering the same to a mold, said deflector being generally upright and U-shaped in cross section, each of the scoop, trough and deflector being made from aluminum and having on their inner surface a hard smooth layer of aluminum oxide, the thickness of the aluminum oxide being between about .0015 inch and .008 inch, whereby the hot glass charge may be conveyed by the scoop, trough and deflector without the use of a lubricant notwithstanding the fact that the hot glass charge may have a temperature in excess of 1000° and the tendency to stick to the scoop, trough or deflector in the absence of said layer.

References Cited

UNITED STATES PATENTS

| | | | |
|---|---|---|---|
| 2,141,930 | 12/1938 | Patridge | 65—374 |
| 2,377,076 | 5/1945 | Ford | 65—26 |
| 2,758,421 | 8/1956 | Smith | 65—304 |
| 2,859,559 | 11/1958 | Mumford | 65—304 |
| 2,873,555 | 2/1959 | Conrad | 65—374 X |
| 2,943,355 | 7/1960 | Zink | 65—304 X |
| 3,245,674 | 4/1966 | Baer et al. | |

DONALL H. SYLVESTER, *Primary Examiner.*

F. W. MIGA, *Assistant Examiner.*